United States Patent [19]

Riegler

[11] Patent Number: 5,529,624
[45] Date of Patent: Jun. 25, 1996

[54] INSULATION MATERIAL

[76] Inventor: Norbert Riegler, Sauerbruchstrasse 56, Wels, Austria, A-4600

[21] Appl. No.: 226,346

[22] Filed: Apr. 12, 1994

[51] Int. Cl.$^6$ .................................................. C04B 16/08
[52] U.S. Cl. ........................ 106/675; 106/681; 106/698; 106/711
[58] Field of Search .................................. 428/688, 288; 106/675, 681, 698, 711

[56] References Cited

U.S. PATENT DOCUMENTS

| | | | |
|---|---|---|---|
| 4,303,450 | 12/1981 | Hacker | 106/88 |
| 4,518,431 | 5/1985 | Duvier, Jr. | 106/97 |
| 4,715,896 | 12/1987 | Berry | 106/117 |
| 5,002,438 | 3/1991 | Strong | 405/303 |
| 5,169,566 | 12/1992 | Stucky et al. | 252/629 |

*Primary Examiner*—Christopher W. Raimund
*Attorney, Agent, or Firm*—Collard & Roe

[57] ABSTRACT

An improved fire retardant insulation material for buildings is disclosed. The insulation material comprises a mixture of perlite and natural or synthetic zeolite bound together by a lime-cement mixture. The insulation is reinforced by a three dimensional inorganic fiber network which bonds with the other materials to form exceptionally stable insulation materials. Natural volcanic rock may also be added to the lime cement binder as a replacement for a part of the perlite/zeolite mixture.

3 Claims, 2 Drawing Sheets

INSULATION MATERIAL

FIELD OF THE INVENTION

The present invention relates to improved fire retardant insulation materials for buildings which possess outstanding insulating qualities, are economical and can readily be formed in any desired shape or thickness. More particularly, the insulation materials of this invention comprise either the expanded volcanic material known as perlite, at least one natural or synthetic zeolite, or a mixture of the two, bound together by a lime-cement mixture. These insulation materials also contain a three-dimensional inorganic fiber network which bonds with the other materials present to form exceptionally stable insulation materials. Natural volcanic rock in finely divided form may also be added to the lime-cement binder as a replacement for a part of either or both ingredients.

BACKGROUND OF THE INVENTION

The increasing recognition of the hazards of using asbestos for insulation purposes has created a demand for improved light weight, inexpensive, readily processable, environmentally safe insulation materials.

In addition, there exists a long-recognized need for an insulation material that is effective to protect steel-reinforced buildings against buckling or warping when exposed to the intense heat generated by fires, especially those of long duration.

German Patent 27 07 235 granted Aug. 16, 1979 and Austrian Patent 347647 granted Jan. 10, 1979 describe an insulation material devised by the present inventor which is sound-resistant, which consists essentially of 6–10 parts by volume of perlites held together with 1.6 to 4.0 parts by volume of inorganic binders (i.e., cement and calcium hydrate). In making this material 1.7 to 4.25 parts by volume of water at ambient temperature or lower was added to the mix. This material was also able to "breathe" and hence to protect inner wall surfaces against undesired condensation of moisture thereon, as well as to protect outer walls against effects of driving rain and seepage of exterior moisture, e.g., from melting ice or snow. Due to its high heat penetration resistance and its low heat conducting number, this material was an effective insulator and therefore promoted economy and efficiency in connection with the heating and air conditioning of the buildings in which it was used.

SUMMARY OF THE INVENTION

The present invention solves the presently recognized need and demand for improved insulation materials. According to the invention, this insulation material comprises as a principal ingredient either perlite or at least one natural or artificial zeolite or a mixture of the two. These ingredients are held together by a binder composition comprising calcium hydroxide (hydrate of lime) and cement in a ratio of between about 5 to 95 parts of calcium hydrate per approximately 95 to 5 parts cement by volume. In all instances, from 0.5 to 20 percent of either ingredient may be replaced by particulate volcanic rock. The binder composition is added in a volume ratio of about one part to about six parts of perlite, zeolite or combined perlite and zeolite. The insulation material of this invention also includes a three-dimensional network of inorganic fibers, preferably glass fiber strips, which is interspersed throughout the composition. These inorganic fiber strips greatly improve the dimensional stability of the insulation material by reducing its vertical and horizontal stretch coefficient. They also contribute significantly to ease of handling at construction sites.

In particular, the insulation materials of this invention are not flammable. They will withstand temperatures of about 1,273° K. and even higher for periods in the order of 2–3 hours without any significant structural change.

The novel insulation materials of this invention, when properly installed with an air space between the insulation and the building wall, preferably between the outer wall and the insulation, exhibit remarkably good heat and cold-insulation relative to synthetic foamed plastic insulation panels and also are improved in these properties in relation to the perlite-containing panels of the prior art.

Still further, the insulation materials of the present invention, when hydrophobically treated with well known, commercially available water repellent materials, at least on the side facing a plaster wall, do not absorb moisture and are therefore stable and long lasting. In this regard, it should be noted that for many applications where the insulating material is to be exposed to exterior moisture effects, such as driving rain, seepage of soil moisture, and the like, it is desirable to treat the insulation material of this invention either throughout its mass or on all sides of an element, such as a panel, into which it is formed.

BRIEF DESCRIPTION OF THE DRAWINGS

FIG. 2 shows the air gap 3 between the novel insulation 4 herein described and the brick wall 2.

These drawings are more fully described below.

DETAILED DESCRIPTION OF THE INVENTION, INCLUDING THE PRESENTLY PREFERRED EMBODIMENTS

The insulation material of the present invention is, as already noted, distinguished from those presently in use by its outstanding fire retardant properties, its exceptional heat and cold-insulation capability and its highly effective resistance to moisture. It also possesses good sound insulation properties.

Figure 1:
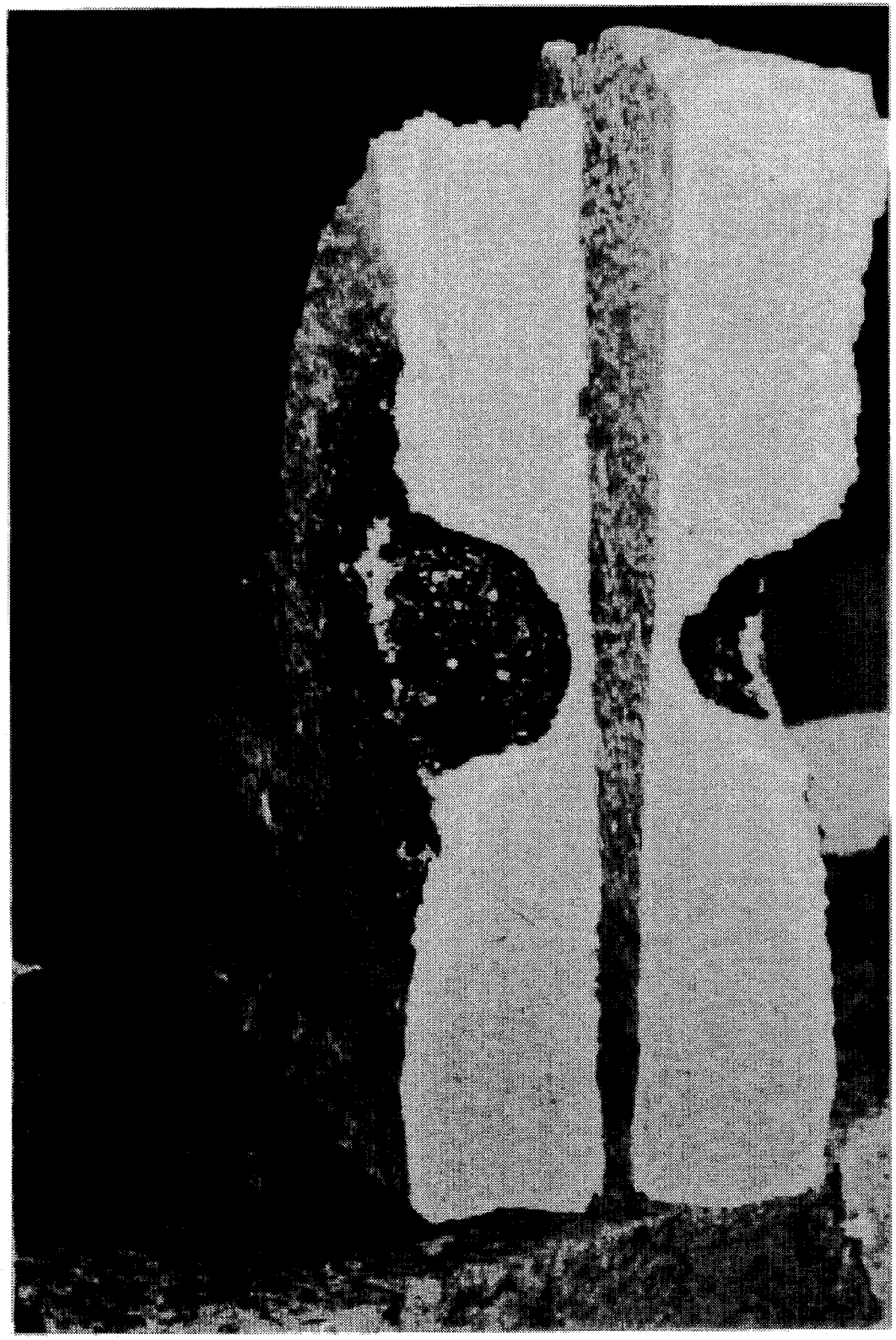
FIG. 1 hereof is a photograph of an insulation panel of 50 mm. thickness, made according to this invention, which was exposed on each face to an oxyhydrogen flame at a temperature of about 2,773.15° K. The flame melted away a conical cavity at the places of direct contact, but had no discernible effect elsewhere on the panel.

FIG. 1 demonstrates the outstanding fire retardant properties of the insulation materials of this invention in that it shows the results of a demanding experiment found to be readily repeatable. In this experiment, a panel of insulation material of this invention, in 50 mm. thickness was deliberately exposed to a direct oxyhydrogen flame at a temperature of about 2,773.15 ° K. The panel was then cut in two to enable testing of the interior of panel, as shown in the photograph. Even though FIG. 1 shows that the specific areas of the insulation panel directly exposed to the flame melted, it also shows that there was no attenuation of the adjacent areas on the same sides of the panel that were untouched by the flame. It equally shows that the interior of the insulation panel which had no direct exposure to the flame remained unchanged throughout. During the actual experiment —and even though the insulating material was melted to a residual thickness of only seven millimeters in the localized opposed areas that were separately contacted by the flame—the unexposed face of each panel exhibited no temperature increase whatever, even in the area directly behind the area of direct contact with the flame.

It has further been shown that insulation panels of this invention will withstand temperatures of at least 1,273.15° K. for several hours without the occurrence of apparent structural change.

Tests on a fire protection door equipped with 6-cm. (60 mm.) thick fire retardant elements made from insulation materials of this invention, used as fire retardant inserts, have shown that 90 minutes' exposure of one side thereof to a temperature of 1,243.15° K. (slightly above 970° C.) resulted in measured temperature readings on the other side of the door no higher than 373.15° K. (about 100° C.) in the hottest spots and less at some locations. Many governmentally established fire codes use the same or a similar test to determine the suitability of insulation for incorporation as a lining in fire resistant doors. In Austria, the official Fire Protection Standard (Ö NORM) T90 specifies that the insulation is satisfactory for this use if the highest temperature reached on the unheated side is 413.15° K. (140° C.). The result of this test and the low specific density exhibited by the present novel insulation material establish this material as superbly well suited to use as an insert for fire retardant doors.

In addition, the insulating materials of the present invention exhibit a water vapor diffusion resistance value ($\mu$) in the order of 4–10 as measured by a published test used by government laboratories in Austria. This $\mu$ value is of considerable advantage in the insulation of steel structures in that it fosters outward diffusion, away from the steel, of condensation that occurs between the steel structure and the insulation material.

The low water vapor diffusion resistance values $\mu$ of the insulation materials of this invention is in contrast to the high $\mu$ values of present commercially available insulation materials comprising organic foams. Such organic foams, in general, have a very dense, close-packed molecular structure. Their resulting high $\mu$ values hamper the "breathing" of walls to which they are affixed or fastened. Water of condensation, e.g., formed by interaction with chemicals present in the wall structure, may not only reach a high level, but may penetrate the structural core of the material and cause degradation. In addition, it is well known that a heat insulation material, the core of which has been penetrated with about 10 percent of moisture may lose as much as 50 percent of its heat insulation capability. This has led to a prohibition in many official building codes against the use of organic foam insulation materials in buildings of several stories. For example, the Austrian Construction Codes prohibit use of even fire-resistant organic foam insulation in buildings of more than five stories. By contrast, the insulation materials of this invention have no such drawbacks.

Those heat insulating materials of the prior art that employ expanded volcanic rock (perlite) as their main ingredient and are directly affixed (as plaster) or attached (as separately formed panels) to a wall, whether formulated as direct plastering compositions or as discrete insulation panels, often exhibit high heat conductivity values and thereby fail to achieve the desired level of heat insulation. This is attributable to the exposure of the composition to high mechanical stress resulting from one or more of long mixing times, inaccurately dosed moisture additions, or faulty processing caused by addition of unduly hard ingredients, such as, e.g., quartz, certain types of sands or gravel. Spraying of plaster compositions on walls with mechanical apparatus is also a source of high mechanical stress to the perlite granules.

The expanded perlite granule is relatively soft and has a closed outer layer which is open only to diffusion of gases. Mechanical stress breaks down the outer layer and allows binder compositions and any other solid or solidifiable ingredient present to displace the air enclosed by the outer layer. Since the enclosed air content of expanded perlite is responsible for the heat insulating qualities of the perlite granules, its displacement by other materials significantly reduces the heating-insulating qualities of compositions comprising perlite.

The insulating material of this invention is not as susceptible to the undesired effects of mechanical stress as the perlite-based insulation material of the prior art because the included zeolites, when present, and in all cases the three-dimensionally interlinked glass fiber strips in this novel material act to shield the perlite granules from being ruptured during mixing and other potentially stressful processing steps.

Certain types of outer wall insulation panels in current use require so-called "back ventilation" with movable air and therefore tend to exhibit reduced heat-insulating capacity. In such panels a mixture of organic and/or inorganic materials are bound with similar organic and/or inorganic binders and installed by placing at a distance of several centimeters from the walls by means of slats positioned in the open back-ventilated system. The use of open back ventilation in these systems is necessary to dry condensed moisture and sprayed moisture that penetrates through cracks in the panels by means of the current of moving air from the back-ventilation. Clearly, however, any moving medium, including moving air, removes heat from the adjacent material and decreases its insulative capability.

Figure 2:
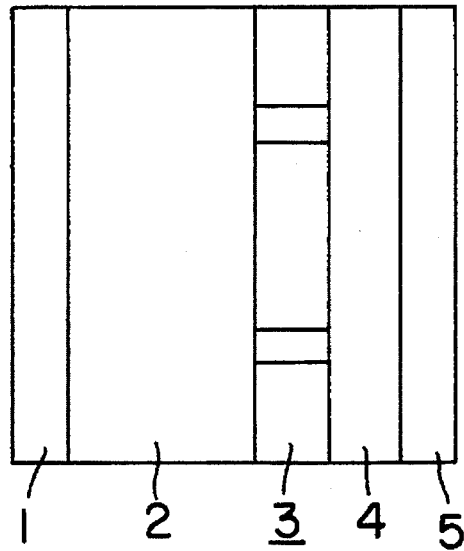
FIG. 2 depicts the proper installation of an insulation panel 4 of this invention in the same structure wherein a brick wall 2 is faced with plaster 1 on the interior and insulation is placed between the brick wall 2 and the exterior stucco 5.

By contrast, the insulation material of the present invention sets into a structure of sufficient density and toughness that it can be fastened by means of screws, nails, studs and the like at a predetermined distance from other parts of wall structure in such a way that a "dead" air space, convection blocked both horizontally and vertically, is present. This construction with dead air space is illustrated in FIG. 2 which represents a segment of a typical wall construction utilizing an insulation panel of this invention. In FIG. 2, numeral "1" represents an inside wall of a building and numeral "2" is a brick wall over which 1, which may be conventional plaster or drywall paneling, is overlaid. Numeral 5 as shown is an outside plaster or stucco type wall, but could also be brick, stonework, lumber or any other exterior building material. Numeral 4 refers to insulation material of this invention and numeral 3 refers to a dead air space that is vertically and horizontally convection blocked and sealed off from the outside in all directions. The insulation material of this invention 4 is uniformly spaced from the interior brick at a distance of between about 0.5 and about 10 cm., e.g., 8.5 cm., and is attached to the brick by crosspieces of the type A, A' which may be studs, slats or other devices that can be firmly affixed to both the interior wall material 2 (in this instance brick) and the insulation 4. As those skilled in the building trades will readily understand, wall material 2 could be structural steel, wood lath or any other desirable interior structure and the crosspieces of the type A, A' will be interspersed at regular intervals throughout the height of the wall.

Figure 3:
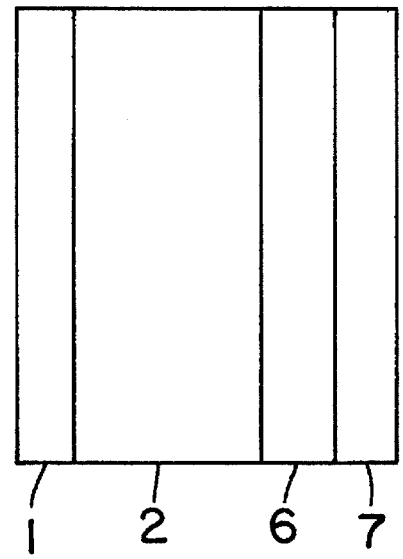
FIG. 3 depicts a typical insulation installation wherein a synthetic polymer foam insulation panel 6 of the prior art is placed between exterior plaster or stucco 7 and a brick wall 2 faced with plaster 1 on the interior.

FIG. 2 is to be contrasted with FIG. 3 which depicts a segment of the same type of wall construction wherein panels of conventional synthetic foam panels are employed as insulation material. In FIG. 3, the numerals 1 and 2 have the same significance as in FIG. 2. Numeral 6 refers to a synthetic foam panel and numeral 7 to the outside facing material—here plaster or stucco for synthetic foam insulation panels. As FIG. 3 demonstrates, no interior dead air space is provided when synthetic foam insulation is utilized.

The dead air between the inner walls and the insulation material of this invention has a strong heat insulating effect which adds to the overall heat insulation provided by this invention. Overall, the insulation material of this invention and the wall construction in which it is used, with provision for a "resting" or "dead" air space in the wall contributes markedly to energy saving.

The table below compares the typical thickness measurements "d" of the wall elements represented by FIGS. 2 and 3 and supplies the heat conductivity value "$\lambda$" for each at the given thickness:

TABLE 1

| | d | $\lambda$ |
|---|---|---|
| 1. Inside plaster | 0.01 m. | 0.6 |
| 2. Brick interior wall | 0.25 m. | 0.35 |
| 3. Dead air space | 0.05 m. | 0.028 |
| 4. Insulation panel of this invention | 0.05 m. | 0.075 |
| 5. External plaster for insulation panel of the invention | 0.02 m. | 0.6 |
| 6. Synthetic foam insulation panel | 0.05 m. | 0.04 |
| 7. External plaster for synthetic foam insulation | 0.005 m. | 0.6 |

From the values in the table, "D", the heat penetration resistance, is calculated for each of the wall elements according to the equation $D=d/\lambda$ and the heat insulation properties of the material of the present invention are thus compared with those of typical currently used synthetic foam insulation panels, as in Tables 2 and 3 below.

TABLE 2

| | 2(Insulation of this Invention) D value | |
|---|---|---|
| Item No. | Material | D Value |
| 1 | inner wall | 0.017 |
| 2 | brick wall | 0.714 |
| 3 | dead air | 1.786 |
| 4 | insulation of this invention | 0.667 |
| 5 | outer wall for insulation of the invention | 0.033 |

TABLE 3

| | (Synthetic Foam Insulation) D value | |
|---|---|---|
| Item No. | Material | D Value |
| 1 | inner wall | 0.017 |
| 2 | brick wall | 0.714 |
| 6 | synthetic foam insulation panel | 1.250 |
| 7 | outer wall for synthetic foam panel | 0.008 |

In order to compare the total heat penetration resistance values, $\Sigma D$, for each of the walls postulated in Tables 2 and 3, one must add in the sum of the heat transition coefficients for the interior building wall and the exterior building wall. These coefficients are the respective reciprocals of the heat transition resistance values for the interior wall and the exterior wall. These values give an indication of the resistance facing a medium, such as air, in passing through a more solid and less porous medium into one of different characteristics. For the exemplary situations of Tables 2 and 3 where the same interior wall construction is postulated and the exterior walls for the insulation materials of the invention and of the prior art, respectively, have been selected to have the same $\lambda$ value, the heat transition resistance values and their reciprocals—i.e., the heat transition coefficients—are identical. For the interior wall the coefficient is 0.123; for the exterior wall, the coefficient value is 0.043. Therefore, to calculate $\Sigma D$, 0.166 must be added to the respective sums of the D values in each of Table 2 and Table 3. This results in a $\Sigma D$ of 3.383 for Table 2, a wall including the insulation of this invention and a $\Sigma D$ of 2.155 for Table 3, a wall containing prior art synthetic foam insulation. Since k, the heat penetration coefficient=$1/\Sigma D$, the k-value of the wall containing the insulation of this invention is 0.30 while the k-value for the wall containing the insulation of this invention is 0.30 while the k-value for the wall containing synthetic foam insulation is 0.46.

The k-value is utilized by architects and builders in connection with planning and erecting buildings. The lower this value is, the better insulation the wall provides against heat loss in times of extreme external cold and against heat absorption at times of extreme external heat.

Viewing the wall constructions of FIGS. 2 and 3 from another perspective, it can be seen, e.g., that where the inner wall elements 1 and 2 are identical and have an identical conductivity, and the outer wall elements are selected so that each has the same heat transfer characteristics, the insulation material of this invention and its adjacent dead air layer will have a greater heat insulating effect than the synthetic foam insulation of the prior art. This is because heat seeking to pass outward will have to transit two layers of low heat conductivity, the dead air layer and the insulation layer. Since the heat conductivity of dead air is very low, only a minimum proportion of the heat that passes the inner walls will be conducted to the layer of insulation material of this invention—and it in turn will conduct only a very small part of the heat that reaches it to the exterior wall. Similarly, under hot summer weather conditions, heat that is conducted inward by the outer wall will be more effectively prevented from entering the interior of a building by the two contiguous layers, or zones, of low heat conductivity in the wall construction of FIG. 2 than by the single low heat conductivity layer of FIG. 3.

Of importance to the present invention is the need for treating the novel insulation material herein described with a hydrophobic agent. This may be done by simply mixing a known commercially available water repellent agent such as, e.g., Silicone Masonry Water Repellent BS20, a product of Wacker Chemie GmbH, Munich, Germany or another alkali metal alkyl siliconate, such as a potassium ethyl siliconate, with the composition at the time the insulation material is prepared. Alternatively, the insulation in the form of panels may be hydrophobically treated on one or both sides or the insulation material to be applied as a plaster may be coated with water repellent agent on one or both sides at the time of application to a wall element. The water repellency treatment is important because perlite-containing and otherwise inorganically bound, insulating materials that have not had such treatment tend to be highly moisture-absorbent and to become permanently soaked with moisture if applied to damp walls or to conventional interior plaster. In the latter case, the insulation material that has not been made water repellent extracts water from the plaster, causing the latter to crumble or "burn" as it is commonly referred to among those in the building trades, and fail to adhere to the wall. Imparting a water repellent treatment to the insulation material of this invention solves the problem and does not affect the diffusion or "breathing ability" of the material to any significant degree.

Because the insulation material of this invention can be cured to a coherent, tough mass, it can be cut easily with, e.g., an ordinary hand saw, and can easily be shaped to any desired form or size. It can be glued or adhered to structural materials of all types with known adhesives for each such material.

Another advantage of the herein described novel insulation material is that scraps of such material left over from panel formation, broken panels and other previously used parts or pieces of the material can readily be incorporated in new batches and reused.

The ingredients of the insulation materials have already been described generally. Perlite can be of any origin. So can calcium hydroxide. Cement may be any of the inorganic material sold for making concrete. Any natural or synthetic zeolite may be used. The inorganic fiber strips are preferably from glass fibers but other inorganic fibers of similar strength characteristics which can be formed into interlaced networks could also be used. Finely divided volcanic rock of any origin may be used to replace a part of the cement-lime filler. In all instances particle sizes of perlite of about 0 to 10 mm. are preferred, though larger particle sizes are usable for some applications.

To prepare the insulation materials of this invention, perlite and/or zeolite, depending upon the precise recipe to be used, is first mixed with water at a temperature of from about 30° to 100° C., or alternatively with steam. Lime and/or cement and finely divided volcanic rock are then added with further mixing and finally, glass fiber strips are introduced and further mixing is effected until a consistency is reached that can be further processed. This consistency is usually of a liquid or fluid nature, such that the mixture is pourable. In some cases the consistency may be essentially that of a solid mass comprising many damp agglomerates that are then placed in molds or forms by the process of shaking the agglomerates into such molds or forms and then using a tool to distribute the agglomerates relatively evenly within the contours of each mold or form.

Whether of pourable or shakable consistency, the insulation material is allowed to cure or set in the molds or forms for a period of at least about 25–30 days. In general, the formed insulation panels will be considered to be sufficiently set to be used after 28 days. As already noted the mixture may also be coated on walls and, in that case, the building construction schedule should be timed to allow curing to occur sufficiently.

The mixing may be effected in any type of slow to medium speed mixer. Conventional concrete mixers, e.g., are excellent for this use, whether of the semi-automatic or manually powered type. Other useable types of apparatus will readily occur to those skilled in the art. When the mixer is, e.g., a concrete mixer, the presently preferred mixing mode involves preliminary introduction of water at between 30° and 100° C., or of steam, into the mixer, followed by zeolite and/or perlite addition. The mixer is then rotated 8–10 times followed by addition of the binders (i.e., lime, cement and finely divided volcanic rock, as desired). The mixer is then again rotated 8–10 times and glass fiber strips are added, followed by further rotations of the mixer until the mass reaches what the operator perceives to be a desirable pourable or shakable consistency, as explained above.

Inasmuch as numerous other specific variations and permutations of the insulation formulations described herein will be readily apparent to those skilled in this art from the foregoing disclosure, it is intended that the present invention should not be limited by the foregoing specific examples and that the invention as described shall be limited only by the following claims:

The following examples set forth production recipes that represent various insulation compositions within the scope of the present invention; in each 1 part by volume represents 1,000 cubic centimeters of the designated ingredient:

Example 1

| | | |
|---|---|---|
| Main Ingredients: | { | 20.00 parts by volume perlite |
| | | 6.00 parts by volume water at 30–100° C. or steam |
| Binder: | { | 1.67 parts by volume calcium hydroxide (hydrate of lime) |
| | | 1.67 parts by volume cement |
| | | 29.34 total parts by volume |

To the foregoing in the last mixing step, there is added 0.08 kg. of inorganic fibers, preferably glass fiber strips for each 29.34 total parts of other ingredients Example 2

| | | |
|---|---|---|
| Main Ingredient: | { | 20.00 parts by volume perlite |
| | | 6.00 parts by volume water at 30–100° C. or steam |
| Binders: | { | 1.67 parts by volume calcium hydroxide |
| | | 1.57 parts by volume cement |
| | | 0.10 parts by volume finely divided volcanic rock |
| | | 29.34 total parts by volume |

In the final mixing step 0.08 kg. of inorganic fiber strips, preferably glass fiber strips, is added for each 29.34 total parts of other ingredients.

It should be noted that the recipes of Examples 1 and 2 provide insulation materials of especially outstanding heat insulating and dehydrating qualities.

Example 3

| Main Ingredients: | 17.3 parts by volume perlite |
| --- | --- |
| | 2.70 parts by volume natural or artificial zeolite |
| | 6.00 parts by volume of water at 30–100° C. or steam |
| Binder: | 1.67 parts by volume calcium hydroxide |
| | 1.67 parts by volume cement |
| | 29.34 total parts by volume |

In the final mixing step 0.08 kilograms of glass fiber strips or a comparable inorganic fiber are added for each 29.34 total parts of other ingredients.

Example 4

| Main Ingredients: | 17.30 parts by volume perlite |
| --- | --- |
| | 2.70 parts by volume natural or synthetic zeolite |
| | 6.00 parts by volume water at 30–100° C. or steam |
| Binder: | 1.67 parts by volume calcium hydroxide |
| | 1.42 parts by volume cement |
| | 0.25 parts by volume finely divided volcanic rock |
| | 29.34 total parts by volume |

In the final mixing step, 0.8 kg. of glass fiber strips or comparable inorganic fibers are added for each 29.34 parts by volume of other ingredients.

Example 5

| Main Ingredient: | 20.00 parts by volume natural or synthetic zeolite |
| --- | --- |
| | 6.00 parts by volume water at 30–100° C. or steam |
| Binder: | 1.67 parts by volume calcium hydroxide |
| | 1.67 parts by volume cement |
| | 29.34 total parts by volume |

The final step involves mixing in 0.08 kg. of inorganic fiber strips, preferably glass, for each 29.34 parts by volume of total other ingredients.

Example 6

| Main Ingredient: | 20.00 parts by volume natural or synthetic zeolite |
| --- | --- |
| | 6.00 parts by volume of water at 30–100° C. or steam |
| Binder: | 1.50 parts by volume calcium hydroxide |
| | 1.67 parts by volume cement |
| | 0.17 parts by volume finely divided volcanic |
| | 29.34 total parts by volume |

In the final step, 0.08 kg. of glass fiber strips (or another comparable inorganic fiber) are added per 29.34 parts by volume of total other ingredients.

The recipes of Examples 3, 4, 5 and 6 are especially useful in producing insulation for outer walls of masonry buildings of high water content where the masonry must be dried very slowly to prevent formation of heavy exterior cracks.

Example 7

| Main Ingredients: | 12.00 parts by volume natural or synthetic zeolite |
| --- | --- |
| | 8.00 parts by volume perlite |
| | 6.00 parts by volume water |
| Binders: | 1.67 parts by volume calcium hydroxide |
| | 1.67 parts by volume cement |
| | 29.34 total parts by volume |

In the final mixing step 0.8 kg. of inorganic fiber strips, preferably glass fiber strips, are added for each 29.34 total parts by volume of other ingredients.

Example 8

| Main Ingredients: | 12.00 parts by volume natural or synthetic zeolite |
| --- | --- |
| | 8.00 parts by volume perlite |
| Water: | 6.00 parts by volume |
| Binders: | 1.50 parts by volume calcium hydroxide |
| | 1.67 parts by volume cement |
| | 0.17 parts by volume finely divided volcanic rock |
| | 29.34 total parts by volume other ingredients |

To the foregoing, there is added and mixed in 0.8 kg. of inorganic fiber strips, preferably glass fiber strips, for every 29.34 parts by volume of other ingredients.

The recipes of Examples 7 and 8 produce especially useful fire retardant insulation elements.

The foregoing examples illustrate some of the ways in which the compositions of this invention can be varied so as to emphasize a given characteristic, e.g., heat insulation capability or fire retardant ability, over other desirable properties of such insulation materials.

Inasmuch as numerous other specific variations and permutations of the insulation formulations described herein will be readily apparent to those skilled in this art from the foregoing disclosure, it is intended that the present invention should not be limited by the foregoing specific examples and that the invention as described shall be limited only by the following claims.

I claim:

1. A fire retardant, dimensionally stable insulation material for buildings which comprises a mixture of expanded perlite and natural or synthetic zeolite as a main aggregate and a binder comprising from about 5–95 percent by volume of calcium hydroxide and from about 95 percent to about 5 percent of cement by volume, wherein the totality of the foregoing composition is interlinked three-dimensionally with inorganic fiber strips.

2. An insulation material according to claim 1 wherein the volume ratio of total binder to main aggregate is about 1:6.

3. An insulation material according to claim 1 in which from about 0.5 to about 20 percent by volume of said binder is finely divided volcanic rock.

\* \* \* \* \*